(12) United States Patent
Hennecke et al.

(10) Patent No.: US 8,430,217 B2
(45) Date of Patent: Apr. 30, 2013

(54) DAMPER

(75) Inventors: Thomas Hennecke, Leinfelden (DE); Sigmund Braun, Kusterdigen (DE)

(73) Assignee: Robert Bosch GmbH, Stuttgart (DE)

( * ) Notice: Subject to any disclaimer, the term of this patent is extended or adjusted under 35 U.S.C. 154(b) by 498 days.

(21) Appl. No.: 12/663,032

(22) PCT Filed: May 15, 2008

(86) PCT No.: PCT/EP2008/055979
§ 371 (c)(1),
(2), (4) Date: Dec. 4, 2009

(87) PCT Pub. No.: WO2008/148626
PCT Pub. Date: Dec. 11, 2008

(65) Prior Publication Data
US 2010/0163356 A1 Jul. 1, 2010

(30) Foreign Application Priority Data
Jun. 4, 2007 (DE) .......................... 10 2007 025 966

(51) Int. Cl.
*F16F 9/34* (2006.01)
*F16F 9/50* (2006.01)

(52) U.S. Cl.
USPC .................. 188/266.2; 188/282.3; 188/282.4; 188/282.9; 188/317; 188/319.1; 188/322.15

(58) Field of Classification Search ............... 188/266.2, 188/266.3, 266.4, 266.5, 282.2, 282.3, 282.4, 188/282.5, 282.8, 282.9, 317, 319.1, 322.13, 188/322.15
See application file for complete search history.

(56) References Cited

U.S. PATENT DOCUMENTS

| | | | | |
|---|---|---|---|---|
| 4,653,617 A | * | 3/1987 | Casimir et al. | 188/282.5 |
| 5,146,948 A | * | 9/1992 | Runkel | 188/282.5 |
| 6,182,805 B1 | | 2/2001 | Kashiwagi et al. | |
| 2002/0189913 A1 | | 12/2002 | Lemieux | |

FOREIGN PATENT DOCUMENTS

| | | |
|---|---|---|
| DE | 10163217 A1 | 7/2003 |
| EP | 1182374 A2 | 2/2002 |
| FR | 2805872 A1 | 9/2001 |

* cited by examiner

*Primary Examiner* — Thomas J Williams
(74) *Attorney, Agent, or Firm* — Maginot, Moore & Beck (57) ABSTRACT

The invention relates to a damper having a damper cylinder, in which a piston plunger is guided via a piston rod. For the adjustment of characteristic damper values, the flow of a damper fluid can be controlled via control mechanism disposed inside the damper cylinder, which controls the flow of the damper fluid in a first flow direction using a first adjusting element and in a second flow direction using a second adjusting element. According to the invention, the first and second adjusting elements are provided with at least one spring element. The spring rate of at least one of the spring elements can be adjusted for defining a damping behavior using corresponding defining or predetermining elements.

16 Claims, 6 Drawing Sheets

DAMPER

CROSS-REFERENCE TO RELATED APPLICATION

This application is a 35 USC 371 application of PCT/EP2008/055979 filed on May 15, 2008.

BACKGROUND OF THE INVENTION

1. Field of the Invention

The invention is based on a damper, and in particular used in a shock absorber for a vehicle.

2. Description of the Prior Art

In conventional passive shock absorber pistons, spring packets, comprising a plurality of spring disks, are as a rule used for generating a certain characteristic curve for the damping force. In the conventional shock absorber piston, the spring rate of the spring packet is determined once and for all during development and after that can no longer be adjusted. This principle makes an economical, robust construction of a damper piston possible, with at the same very good, time-tested courses of the characteristic damper curves.

In the prior art, dampers for vehicles are also known with adjustable damper pistons, which as a rule operate on the principle of a variable opening cross section. These dampers adjust the appropriate characteristic shock absorber values via hydraulic proportional valves and can be adapted to various driving situations. The proportional valves, for instance with the aid of a control piston that is moved by an exciter coil, control the fluid flow in the damper continuously. The proportional valves are either flanged to the damper or integrated with the piston plunger of the damper. An additional sensor, which is disposed on the wheel suspension, furnishes information about the running-in state of the damper. As the sensors, acceleration sensors or travel sensors can be used. Associated evaluation and control units are either disposed centrally in the vehicle or can be disposed noncentrally on the flanged-on proportional valve. The proportional valve may for instance indirectly control the main fluid flow; that is, a small secondary flow is regulated directly by a small control piston and forms a pressure difference with the main valve. The main fluid flow in the main valve is adjusted on the basis of this regulated pressure difference. As a result, it is attained that with relatively low adjusting forces, a relatively high pressure can be controlled. The reaction time of the damper is limited by the transient response of the proportional valve.

In German Patent Application DE 10 2006 037 172.0, not published prior to the priority date of the present application, of the present applicant, a damper with a damper cylinder is described, in which a piston plunger is guided via a piston rod, and for adjusting characteristic damper values the flow of a damper fluid is regulated. Regulators, which have two independent closed-loop control circuits for a tension stage and a compression stage, are disposed inside the damper cylinder, and during the compression stage period, the regulators regulate the flow of the damper fluid in a first flow direction by a first adjusting element and during the tension stage period they regulate the flow of the damper fluid in a second flow direction by a second adjusting element. One possible adjustment variable of the first adjusting element for an ensuing compression stage period is adjustable by associated first predetermining element during the tension stage period chronologically preceding this compression stage period, and one possible adjustment variable of the second adjusting element for the ensuing tension stage period is adjustable by associated second predetermining element during the compression stage period chronologically preceding that tension stage period.

ADVANTAGES AND SUMMARY OF THE INVENTION

The damper according to the invention has the advantage over the prior art that first and second adjusting elements are each embodied as at least one spring element, and the spring rate of at least one of the spring elements is adjustable for predetermining a damping behavior via corresponding predetermining elements. The at least one spring element can for instance be embodied as a single leaf spring and/or as a leaf spring packet and/or as an individual spring disk and/or as a spring disk packet. The first adjusting element regulates the flow of a damper fluid in a first flow direction, and the second adjusting element regulates the flow in a second flow direction. The damper according to the invention, while maintaining the time-tested leaf spring principle of a passive damper, advantageously makes it possible, by the adjustability of the spring rate of a spring-loaded throttle opening of the piston plunger, to predetermine the damping behavior. Furthermore, the damper of the invention advantageously enables direct control of the fluid flow, which is done practically without delays and/or transient responses.

It is especially advantageous that the predetermining elements are each adjustable in the unloaded state of the corresponding adjusting means via at least one corresponding drive unit, which is triggerable as a function of signals from at least one sensor unit, which is preferably embodied as a pressure sensor unit. In the loaded state of the corresponding adjusting elements, the predetermining elements can each be held in the set position by self-locking. Because the adjustment of the predetermining elements is uncoupled from the actual working stroke of the adjusting elements and takes place in the unloaded state, and because the predetermining elements are held by self-locking during the associated working stroke of the adjusting elements, slight adjusting forces suffice, so that rotary magnets, stepping motors, and the like, for instance, can be used as rotational drive units.

The predetermining elements are for instance each embodied as a slide element, the position of which above the corresponding at least one spring element is variable, for adjusting the spring rate. The corresponding working stroke of the embodied as a spring element is represented by the flow direction in which the associated adjusting element performs the damping work. Furthermore, the damper according to the invention makes a continuously variable and fast selection possible among characteristic damper values and characteristic damper curves, so that a varying selection of the damper characteristic is possible from "very hard" to "very soft", which can advantageously be adjusted independently of one another for a compression stage period and for tension stage period. If the corresponding adjusting elements are embodied as individual spring disks and/or as spring disk packets, then for adjusting the spring rate, the predetermining elements each embodied as a plurality of slide elements can vary their positions radially above the individual spring disk or above the spring disk packet.

In an embodiment of the damper according to the invention, the slide element has a rack segment, which is engaged by a gear wheel segment, which is movable by the corresponding drive unit, for changing the position of the slide element. Depending on the embodiment of the drive unit, in the currentless state for the tension stage and the compression stage, one of the two extreme positions can be predetermined as a fallback position independently. Alternatively, the drive unit can be designed such that the slide element, in a currentless state, stays in a middle position and is movable in the direction of the two extreme positions by way of the application of a positive or negative voltage, as applicable. As a result, in assembly, depending on the tooth engagement between the rack segment of the slide element and the gear wheel segment, a basic adjustment can be preselected from among the characteristic damper curves.

In a further embodiment of the damper of the invention, the spring rate for one of the two spring elements can be fixedly predetermined, and the required spring rate for the other of the two spring elements can be ascertained during operation and can be variably adjusted by means of the corresponding slide element. This makes a simpler, more-economical embodiment of the damper possible.

In a further embodiment of the damper according to the invention, the flow conduits can each be designed such that the corresponding spring element, in the loaded state during the bending operation, beginning at a stop, first passes over a cylindrical region with an only slight cross-sectional increase for adjusting the flow of the damper fluid. As a result, at flow velocities, by means of the slight increase in cross section, inside the cylindrical region, a pilot pressure can be built up which even at low piston speeds effects a desired fundamental damping. Moreover, the flow conduits can each be designed such that the corresponding spring element, in the loaded state during the bending operation, beginning at the stop, at higher flow velocities overshoots edge that defines the cylindrical region. As a result of the overshooting of the control edge, a disproportionate flow cross section is opened up for adjusting the flow of the damper fluid. As a result, a degressive characteristic damper curve can be realized.

In the damper according to the invention, the design of the spring elements determines the damping force range, and the geometry of the flow conduits, and in particular the design of the control edge, determines the characteristic curve, and the geometry of the flow conduits can be realized easily in a cast part. As a result, overall, a simple and economical range of variants can be achieved. The embodiment according to the invention makes a greater spread possible between hard and soft characteristic damper curves, for the same structural size.

Advantageous embodiments of the invention, described below, are shown in the drawings.

BRIEF DESCRIPTION OF THE DRAWINGS

The invention will be described in further detail below in conjunction with the drawings, in which.

DESCRIPTION OF THE PREFERRED EMBODIMENT

In the drawings, identical reference numerals designate elements and components which perform the same or analogous functions.

As can be seen from FIGS. 1 through 4, a damper 1 according to the invention, which is preferably embodied as a shock absorber of a vehicle, includes a damper cylinder 2, in which a piston 10 is movably disposed, the piston including a piston plunger 11 and a piston rod 12. The piston plunger 11 divides the damper cylinder 2 into an upper damper chamber 4 and a lower damper chamber 6. A first sensor unit 16 for instance detects the pressure $P_{upper}$ in the upper damper chamber 4, and a second sensor unit 18 for instance detects the pressure $P_{lower}$ in the lower damper chamber 6. A force F that acts on the piston 10 of the damper 1 is used as a controlled variable for the regulating means. With the aid of the two sensor units 16, 18, the force F that acts on the damper 1 and thus on the vehicle is ascertained directly. The operative force F can be derived directly from the two pressures $P_{upper}$ and $P_{lower}$ detected by the sensor units 16, 18.

Figure 1:
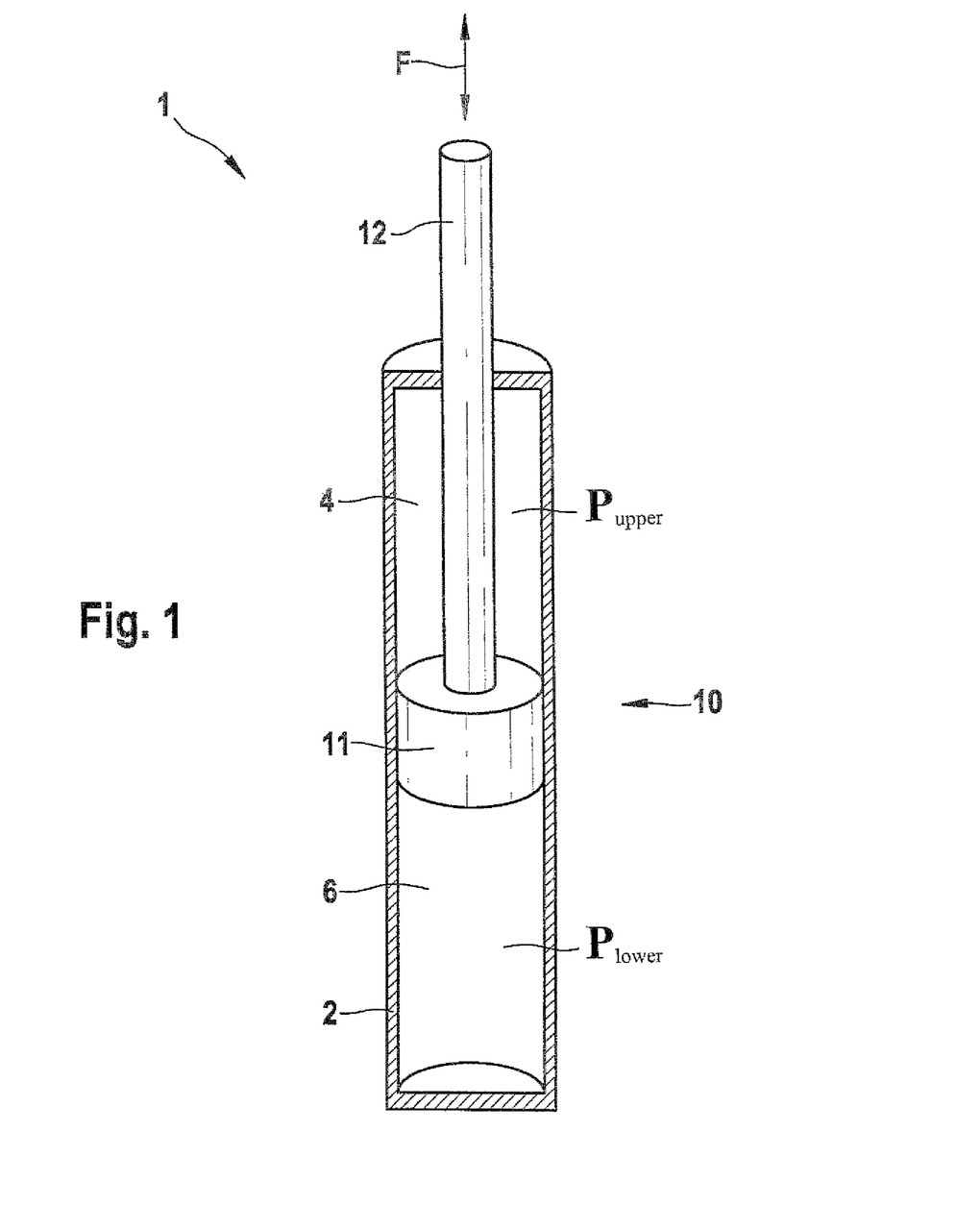
FIG. 1 shows a schematic perspective view of a damper according to the invention.
Figures 2, 3:
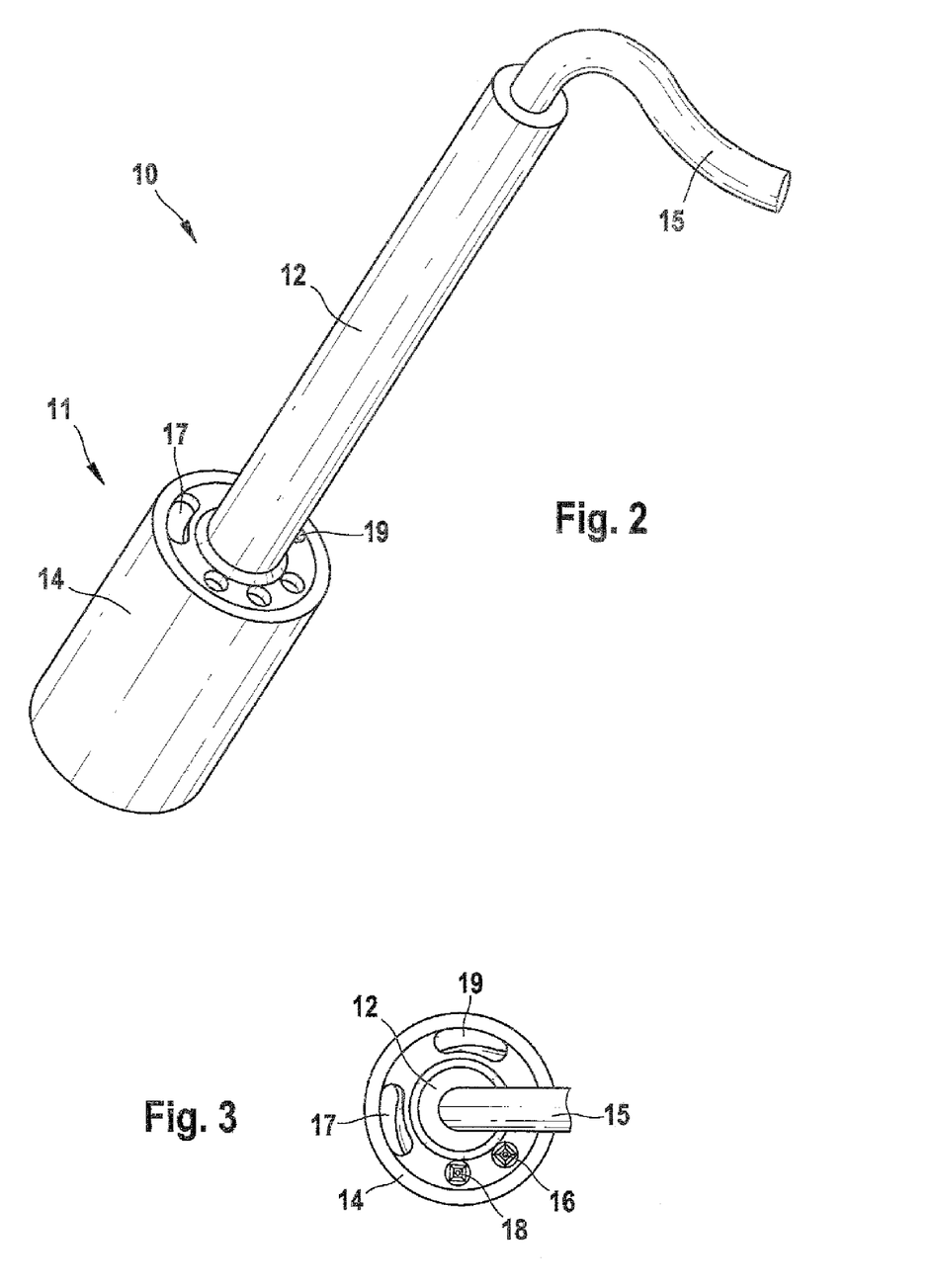
FIG. 2 shows a schematic perspective view of a piston of the damper according to the invention of FIG. 1.
FIG. 3 shows a schematic plan view on the piston of FIG. 2.
Figure 4:
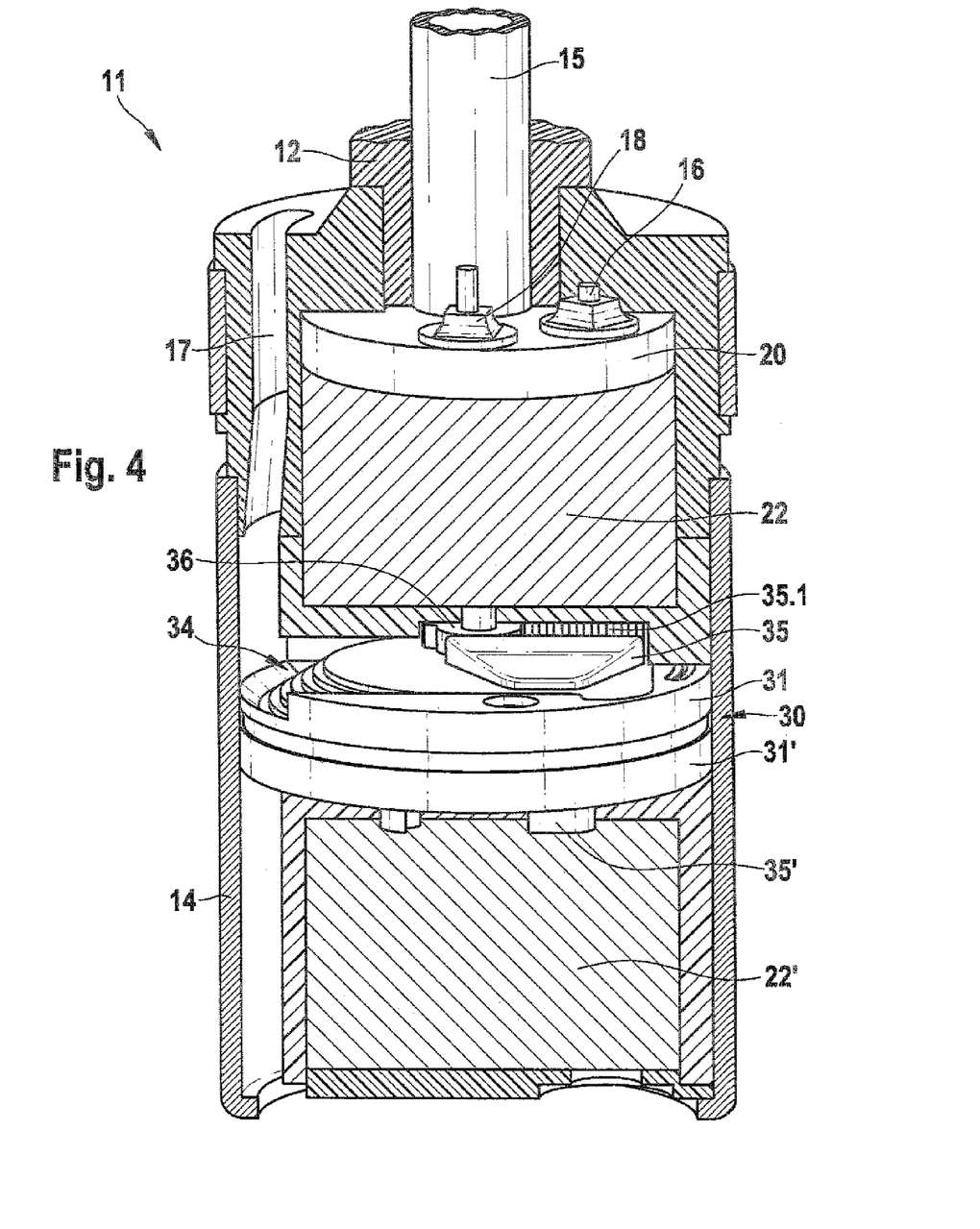
FIG. 4 shows a schematic sectional view of a piston plunger of the piston of FIGS. 2 and 3.

As can also be seen from FIG. 4, the piston plunger 11 is embodied as a compact unit, which as its housing includes a plunger tube 14, which is embodied for instance as a thin-walled steel tube. In the plunger tube 14 are an electronic unit 20, which includes the first and second sensor units 16, 18 and a lead line 15; a first and second drive unit 22, 22', which are each embodied as a rotary magnet, for instance; and an adjusting unit 30, which includes first and second adjusting means 34, 34' (FIGS. 7, 8) and first and second predetermining means 35, 35'. The two sensor units 16, 18 can be embodied for instance as pressure sensors, acceleration sensors and/or travel sensors, which each include an associated electronic circuit. Moreover, an evaluation and control unit, not shown, evaluates the signals of the two sensor units 16, 18 and adjusts the predetermining means 35, 35', via the corresponding drive unit 22, 22', suitably in accordance with the evaluation of the sensor signals; for adjusting the flow of a damper fluid through the first regulating conduit 17 and through a second regulating conduit 19, the predetermining means 35, 35' act on the adjusting means 34, 34'. The evaluation and control unit, not shown, can also be disposed inside the piston plunger 11 and embodied for instance as part of the electronic unit 20. Alternatively, the evaluation and control unit can be disposed outside the damper 1, in an engine control unit. The supply of electric power and the signal transmission for the sensor units 16, 18 and for the control and evaluation unit not shown are effected via the lead line 15, which is extended through a corresponding bore in the piston rod 12 to the piston plunger 11.

The regulating means disposed inside the damper cylinder 2 in the piston plunger 11 include two independent closed-loop control circuits for a tension stage and a compression stage. For regulating the flow of damper fluid through the first regulating conduit 17 in a first flow direction during the compression stage period, the regulating means include the first drive unit 22, the first predetermining means 35, and the first adjusting means 34, which will be described in detail hereinafter in conjunction with FIGS. 5 through 10. For regulating the flow of damper fluid through the second regulating conduit 19 in a second flow direction during the tension stage period, the regulating means include the second drive unit 22', the second predetermining means 35', and the second adjusting means 34', which will be described in detail hereinafter, also in conjunction with FIGS. 5 through 10.

Figure 5:
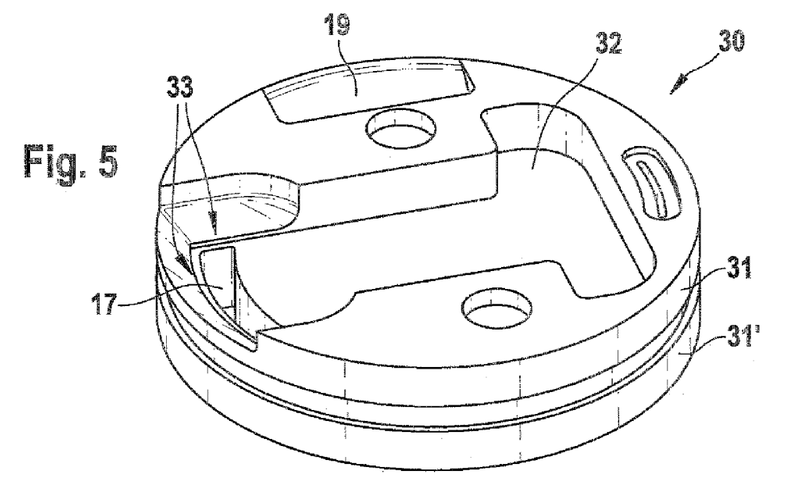
FIG. 5 shows a schematic perspective view of a carrier unit of the piston plunger of FIG. 4.
Figure 6:
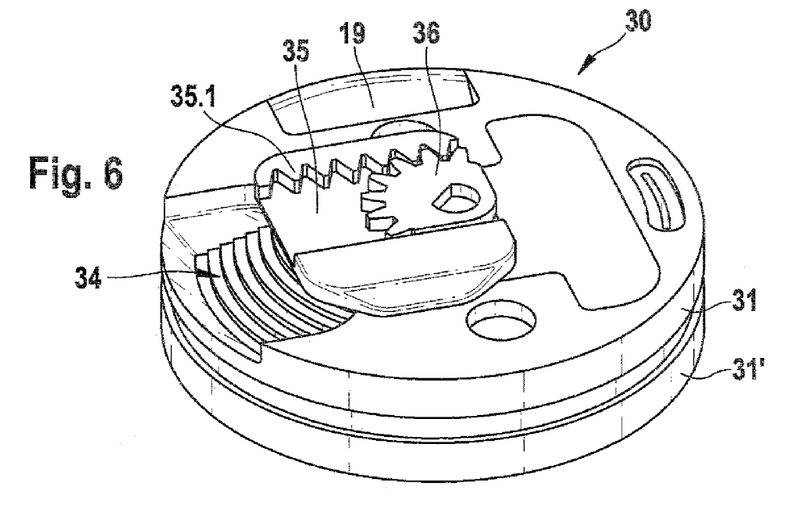
FIG. 6 shows a schematic perspective view of an adjusting unit with the carrier unit of FIG. 5.

As can be seen from FIGS. 5 and 6, the adjusting unit 30 has an upper carrier unit 31 and a lower carrier unit 31', which are constructed identically. The upper carrier unit 31 has a bearing region 32, in which a first spring element, embodied as a leaf spring packet 34, is placed for regulating the flow through the first regulating conduit 17. Furthermore, in the region of the first regulating conduit 17, the upper carrier unit 31 has a control edge 33 for predetermining a characteristic damper curve. Analogously, the lower carrier unit 31 includes a bearing region in which a second spring element, embodied as a leaf spring packet 34', is placed for regulating the flow through the second regulating conduit 19. In addition, the lower carrier unit 31', in the region of the second regulating conduit 19, has a control edge for predetermining a characteristic damper curve. Since the second regulating conduit 19 is rotated by 90° relative to the first regulating conduit 17, the orientation of the second leaf spring packet 34' is also rotated by 90° relative to the first leaf spring packet 34. As can also be seen from FIG. 6, a predetermining means embodied as a slide element 35 is disposed above the first leaf spring packet 34 and, for varying the spring rate, its position above the corresponding first leaf spring packet 34 is variable. For displacement, the first slide element 35 has a rack segment 35.1, which is engaged by a gear wheel segment 36, which for varying the position of the first slide element 35 is rotated accordingly by the corresponding first drive unit 22. Analogously, a predetermining means embodied as a slide element 35' is disposed above the second leaf spring packet 34', and for varying the position of the second slide element 35', this second slide element 35' is rotated accordingly by the corresponding second drive unit 22'.

The mode of operation of the damper 1 according to the invention will be described below in conjunction with FIGS. 7 through 10; for the sake of simpler description, the second regulating conduit 19 is shown rotated by 180° relative to the first regulating conduit 17, and the second leaf spring packet, 34' is shown rotated by 180° relative to the first leaf spring packet 34.

Figure 7:
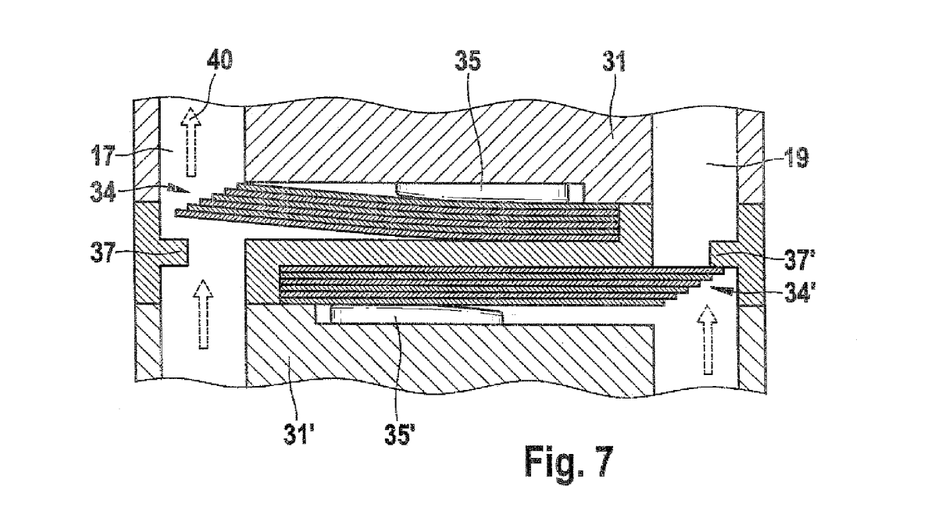
FIGS. 7 through 10 each show a schematic sectional view of the piston plunger, for describing the mode of operation of the damper according to the invention.

As can be seen from FIG. 7, during a compression stage period, a damper fluid flows in the first flow direction 40, which is also called the pressure direction, in the first regulating conduit 17. The damping fluid flowing through opens or bends the first leaf spring packet 34. The bending of the first leaf spring packet 34 and thus the opening angle or opening cross section are predetermined by the springiness, adjusted via the first slide element 35, of the leaf spring packet 34. Thus the first leaf spring packet 34, during the compression stage period, affects the flow cross section of the damper fluid in the first regulating conduit 17, which flows in the pressure direction 40, and thus predetermines the damping force for the compression stage. As can also be seen from FIG. 7, the second leaf spring packet 34', during the compression stage period, is pressed against a second stop 37' by the fluid flowing in the pressure direction 40 in the second regulating conduit 19.

Figure 8:
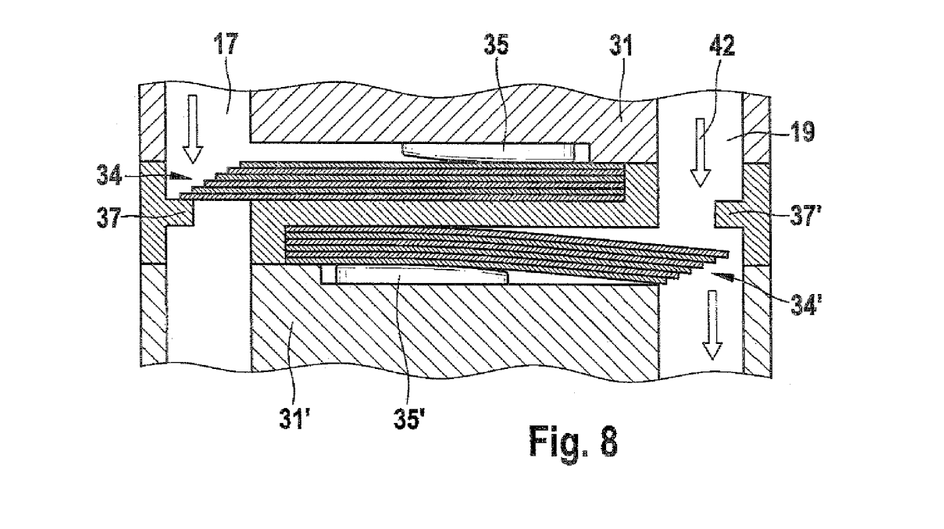

As can be seen from FIG. 8, during the tension stage period, the fluid flow in the first regulating conduit 17 is in the second flow direction 42, which is also called the tension direction. The first leaf spring packet 34 is closed by the fluid flow in the second flow direction 42; that is, the first leaf spring packet 34 rests on a first stop 37. The actual fluid flow in the second flow direction 42 takes place in the second regulating conduit 19, which is regulated, analogously to the above description, by the second leaf spring packet 34'. In this unloaded state of the first leaf spring packet 34, the first slide element 35, with the aid of the first drive unit 22 embodied as a rotary magnet, can be put into a different position with only slight adjusting force.

Figure 9:
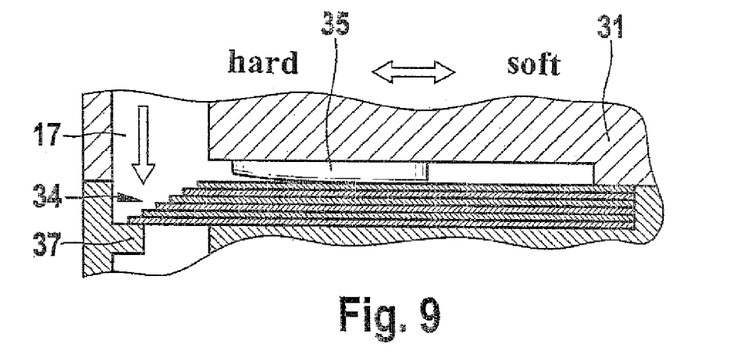
Figure 10:
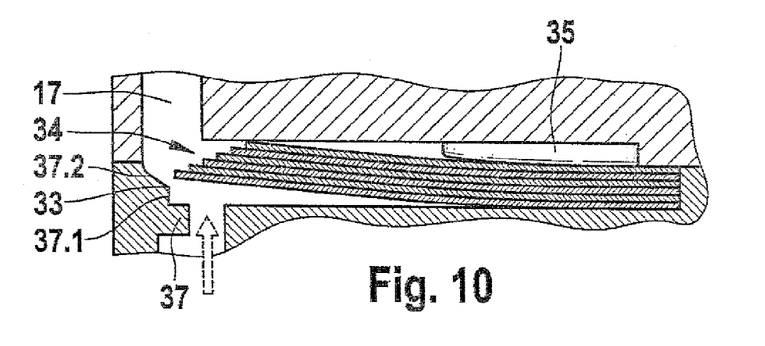

As can be seen from FIG. 9, the first slide element 35, in the unloaded state of the first leaf spring packet 34, can be put into a different desired position with an only slight adjusting force with the aid of the first drive unit 22 embodied as a rotary magnet, and a result the springiness of the first leaf spring packet 34 can be adjusted continuously between the extreme states of "soft" characteristic damper curve and "hard" characteristic damper curve, and the slide element 35 acts as a counterpart bearing for the first leaf spring packet 34. The first drive unit 22 is designed for instance such that the first slide element 35, in a currentless state, remains in a middle position between the two extreme positions of "hard" and "soft", and it can be moved in the direction of the two extreme positions by way of the application of a positive or negative voltage. In the loaded state shown in FIG. 7, the first slide element 35 is kept in its established position without a contrary force during the compression stage period by self-locking, or in other words by means of the bent first leaf spring packet 34. In alternative embodiments of the invention, not shown, in the currentless state, one of the two extreme positions, depending on the embodiment of the drive unit, can be predetermined as a fallback position.

Analogously, in the unloaded state of the second leaf spring packet 34', or in other words during the compression stage period, the second slide element 35' can be put into a different desired position with the aid of the second drive unit 22', embodied as a rotary magnet, with only a slight adjusting force, as a result of which the springiness of the second leaf spring packet 34' can likewise be adjusted continuously between the extreme states of a "soft" characteristic damper curve and a "hard" characteristic damper curve, with the slide element 35' acting as a counterpart bearing for the second leaf spring packet 34'.

The position of the first and second slide element 35, 35' is ascertained by evaluation of the signals from the first and second sensor units 16, 18, respectively. Via the first and second sensor units 16, 18, the respective current damping force is ascertained. The ascertained pressure value or damping force is compared with a desired pressure value or a desired damping force. Next, via the suitable triggering of the respective drive unit 22, 22', the position of the corresponding slide element 35, 35' is changed, as soon as the affected slide element 35, 35', upon the next change of direction of the fluid flow, is no longer loaded. For the next period, the associated slide element 35, 35' is now in its new position and predetermines the desired new damping characteristic, via the established springiness of the corresponding leaf spring packet 34, 34'. By the described mechanical separation of the tension stage period and the compression stage period, an unambiguous and independent regulation can be attained for the two damping forces, via the regulation of the flow of damping fluid through the first regulating conduit 17 and the second regulating conduit 19. The adjustment of the slide elements 35, 35' for adjusting the associated springinesses of the leaf spring packets 34, 34' for the tension stage period and compression stage period is advantageously always done during the unloaded state of the respective slide element 35, 35'.

The characteristic damper curve characteristic can be predetermined by means of the geometry of the corresponding flow conduit or regulating conduit 17, 19. As can be seen from FIG. 10, the flow conduit 17 and 19 can be designed such that the corresponding leaf spring packet, in this case the first leaf spring packet 34, during the bending operation first passes over a cylindrical region 37.1 with a slight increase in cross section, in which the flow cross section does not increase disproportionately until above a control edge 33 that is to be determined. Therefore in the loaded state, the corresponding leaf spring packet 34 moves from the stop 37 at low flow velocities only within the cylindrical region 37.1, in order to effect a slight increase in cross section for adjusting the flow of damper fluid, as a result of which a defined pilot pressure can build up which brings about a desired fundamental damping even at low piston speeds. At higher piston speeds, the leaf spring packet 34 overshoots the control edge 33 and opens up a disproportionately large flow cross section 37.2. As a result, advantageously, a desired degressive characteristic damper curve is attainable. By means of the design of the leaf spring packets, the corresponding damping force range can be determined, and thus a range of variants can easily be attained.

In an alternative embodiment of the damper of the invention, not shown, the springiness for one of the two leaf spring packets 34, 34' can be fixedly predetermined, and the requisite adjustment variable for the other of the two leaf spring packets 34, 34' can be ascertained during operation and adjusted variably by means of the corresponding slide element 35, 35'. For instance, the damper flow in the first regulating conduit 17 can be regulated by means of predetermination of a constant springiness for the associated first leaf spring packet 34. As a result, the first drive unit 22 and the first slide element 35 can advantageously be dispensed with. The damper fluid flow in the second regulating conduit 19, however, is embodied variably and, as explained above, can be varied via the second leaf spring packet 34', by means of the adjustable second slide element 35'. Analogously, the damper fluid flow in the second regulating conduit 19 can be regulated by predetermination of a constant adjustment variable for the associated second leaf spring packet 34'.

Figure 11:
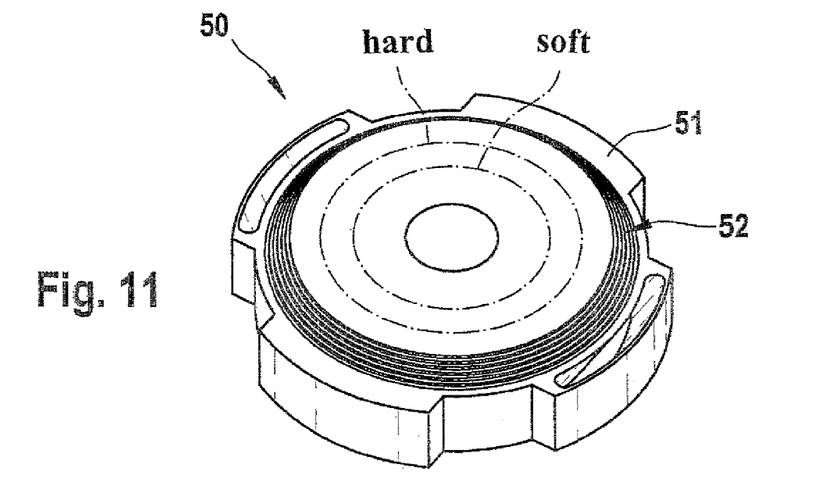
FIG. 11 shows a schematic perspective view of a different embodiment of the carrier unit with adjusting means.

As can be seen from FIG. 11, an alternative embodiment of an adjustment unit 50 has a carrier unit 51, in which a spring disk packet 52 is placed for regulating the flow through a regulating conduit. Slide elements, not shown, are disposed above the spring disk packet 52 shown, and their positions radially above the spring disk packet 52 are variable, for predetermining a springiness; the springiness of the spring disk packet 52 can be adjusted continuously from the inside outward between the extreme states of a "soft" characteristic damper curve and a "hard" characteristic damper curve.

The embodiments of the damper of the invention advantageously make it possible always to make the specific optimal setting of the characteristic damper values for various driving situations. In contrast to a conventional hydraulic proportional valve, the spring elements of the invention make direct regulation of the main fluid flow possible practically without delays or transient responses, and the regulation can advantageously be done with only slight adjusting forces by means of decoupling the adjustment operation from the actual working stroke. Because of the very compact embodiment that is possible, the damper of the invention is also suitable for damping the cabs of utility vehicles, vehicle seats, cots, and so forth. Moreover, the damper of the invention is also suitable for applications outside the vehicle field, for instance in mechanical engineering, that require a regulatable damper of compact form.

The foregoing relates to the preferred exemplary embodiment of the invention, it being understood that other variants and embodiments thereof are possible within the spirit and scope of the invention, the latter being defined by the appended claims.

The invention claimed is:

1. A damper having a damper cylinder, in which a piston plunger is guided via a piston rod, and for adjusting characteristic damper values, the flow of a damper fluid is regulated via regulators disposed inside the damper cylinder, and the regulators regulate the flow of the damper fluid in a first flow direction by first adjusting elements and in a second flow direction by second adjusting elements, the first and second adjusting elements each being embodied as at least one spring element and a predetermining element comprising a plate slidably disposed over the at least one spring element so that a spring rate of the at least one spring element is adjustable for predetermination of a damping behavior by the corresponding predetermining element, wherein the predetermining elements are each adjustable in an unloaded state by a corresponding adjusting element via at least one corresponding drive unit, which is triggerable as a function of signals from at least one sensor unit, and wherein the predetermining elements are each embodied as a slide element movable between two extreme positions which radially above a corresponding at least one spring element embodied as a spring disk and/or spring disk packet are variable, for adjusting the spring rate.

2. The damper as defined by claim 1, wherein the predetermining elements are configured to be retained in position by self-locking, each in a loaded state of the corresponding adjusting element.

3. The damper as defined by claim 1, wherein the slide element has a rack segment, which is engaged by a gear wheel segment, which is movable by a corresponding drive unit, for changing the position of the slide element.

4. The damper as defined by claim 1, wherein the drive unit is designed such that in a currentless state, the slide element is movable into one of the two extreme positions, as a fallback position.

5. The damper as defined by claim 1, wherein the drive unit is designed such that the slide element, in a currentless state, stays in a middle position and is movable in the direction of the two extreme positions by way of the application of a positive or negative voltage.

6. The damper as defined by claim 1, wherein the spring rate for one of the two spring elements is fixedly predetermined, and a required spring rate for an other of the two spring elements is ascertained during operation and is variably adjustable by means of a corresponding slide element.

7. The damper as defined by claim 1, wherein the spring elements, in a loaded state, are movable at low flow velocities, beginning at a stop, only within a cylindrical region, in order to effect a slight increase in cross section for adjusting the flow of the damper fluid.

8. The damper as defined by claim 7, wherein the spring elements, in a loaded state, are moved at higher flow velocities, beginning at a slop, in such a way that a control edge that defines the cylindrical region is overshot, in order to open a disproportionate flow cross section for adjusting the flow of the damper fluid.

9. A damper having a damper cylinder, in which a piston plunger is guided via a piston rod, and for adjusting characteristic damper values, the flow of a damper fluid is regulated via regulators disposed inside the damper cylinder, and the regulators regulate the flow of the damper fluid in a first flow direction by first adjusting elements and in a second flow direction by second adjusting elements, the first and second adjusting elements each being embodied as at least one spring element, wherein a spring rate of the at least one spring element can be adjusted for predetermination of a damping behavior by a corresponding predetermining element, the predetermining elements each being embodied as a slide element, the position of which above a corresponding at least one spring element is variable for adjusting the spring rate, and wherein the slide element has a rack segment, which is engaged by a gear wheel segment, which is movable by a corresponding drive unit for changing the position of the slide element.

10. The damper as defined by claim 9, wherein the predetermining elements are configured to be retained in position by self-locking, each in a loaded state of the corresponding adjusting element.

11. The damper as defined by claim 9, wherein the predetermining elements are each embodied as a plurality of slide elements, having positions which radially above a corresponding at least one spring element embodied as a spring disk and/or spring disk packet are variable, for adjusting the spring rate.

12. The damper as defined by claim 11, wherein the spring rate for one of the two spring elements is fixedly predetermined, and a required spring rate for an other of the two spring elements is ascertained during operation and is variably adjustable by means of a corresponding slide element.

13. The damper as defined by claim 9, wherein the spring rate for one of the two spring elements is fixedly predetermined, and a required spring rate for another of the two spring elements is ascertained during operation and is variably adjustable by a corresponding slide element.

14. A damper having a damper cylinder, in which a piston plunger is guided via a piston rod, and for adjusting characteristic damper values, the flow of a damper fluid is regulated via regulators disposed inside the damper cylinder, and the regulators regulate the flow of the damper fluid in a first flow direction by first adjusting elements and in a second flow direction by second adjusting elements, the first and second adjusting elements each being embodied as at least one spring element, wherein a spring rate of the at least one spring element can be adjusted for predetermination of a damping behavior by a corresponding predetermining element, the predetermining elements each being adjustable in an unloaded state by the corresponding adjusting element via at least one corresponding drive unit, which is triggerable as a function of signals from at least one sensor unit, the predetermining elements each being embodied as a slide element movable between two extreme positions which radially above a corresponding at least one spring element embodied as a spring disk and/or spring disk packet are variable for adjusting the spring rate, and wherein the drive unit is designed such that the slide element, in a currentless state, stays in a middle position and is movable in the direction of the two extreme positions by way of the application of a positive or negative voltage.

15. The damper as defined by claim 14, wherein the predetermining elements are configured to be retained in position by self-locking, each in a loaded state of the corresponding adjusting element.

16. The damper as defined by claim 14, wherein the spring rate for one of the two spring elements is fixedly predetermined, and a required spring rate for an other of the two spring elements is ascertained during operation and is variably adjustable by means of a corresponding slide element.

* * * * *

UNITED STATES PATENT AND TRADEMARK OFFICE
CERTIFICATE OF CORRECTION

PATENT NO. : 8,430,217 B2
APPLICATION NO. : 12/663032
DATED : April 30, 2013
INVENTOR(S) : Hennecke et al.

Page 1 of 1

It is certified that error appears in the above-identified patent and that said Letters Patent is hereby corrected as shown below:

In the claims:

Claim 8, col. 8, line 51:

Replace "at a slop, in" with -- at a stop, in --

Signed and Sealed this
First Day of October, 2013

Teresa Stanek Rea
*Deputy Director of the United States Patent and Trademark Office*